3,531,433
MICROBE-INHIBITED POLYESTERURETHANES
Otto C. Elmer, Akron, Ohio, assignor to The General
Tire & Rubber Company, Akron, Ohio, a corporation
of Ohio
No Drawing. Filed Sept. 30, 1968, Ser. No. 763,928
Int. Cl. C08g 51/60, 51/64
U.S. Cl. 260—45.8                                12 Claims

ABSTRACT OF THE DISCLOSURE

This invention relates to the preparation of a microbe-inhibited polyesterurethane composition prepared by compounding the polymer composition with a microbe inhibiting amount of a halogenated sulfonyl or sulfinyl pyridine compound, preferably in combination with a polycarbodiimide.

BACKGROUND OF THE INVENTION

A disadvantage of polyurethanes for some applications is their susceptibility to attack by microorganisms. Thus, for example, polyesterurethanes tend to support active fungal and bacterial growth, particularly when used in tropical, medical or like applications. Likewise, many of the compounding ingredients, such as stearic acid, used in polyurethanes tend to support fungal and bacterial growth. Also residues from peroxide curatives, which contain oxygencarbon linkages, are susceptible to attack by microorganisms.

SUMMARY OF THE INVENTION

This invention relates to the preparation of novel polyesterurethane compositions which are highly resistant to the growth of microorganisms such as fungi and bacteria. More particularly, this invention relates to the preparation of novel polymer compositions comprising polyesterurethanes and a microbe-inhibiting amount of a halogenated sulfonyl or sulfinyl pyridine compound.

In accordance with this invention, it has been discovered surprisingly that polyesterurethane compositions, particularly those cured with peroxides, can be protected from attack by microorganisms, e.g. such as fungal or bacterial growth, without degrading the polymer, by coating such compositions and/or incorporating into such compositions any of certain selected halogenated alkylsulfonylpyridines or alkylsulfinylpyridines. While coating the polyesterurethane definitely inhibits any fungal and bacterial growth on the surface of the composition, the halogenated alkylsulfonylpyridine or alkylsulfinylpyridine compound is preferably incorporated into the composition because such incorporation has proven to have a beneficial effect on the compression set of the cured composition.

More particularly in accord with this invention there is prepared a microorganism-resistant polyesterurethane composition containing a microbe-inhibiting amount of at least one pyridine derivative having the general formula L—M—R in which R can be an alkyl, monohalogeno lower alkyl, dihalogeno lower alkyl, trihalogeno lower alkyl, phenyl, monohalogeno phenyl, benzyl or monohalogeno benzyl group; M can be a sulfinyl (—SO—) or sulfonyl (—SO₂—) group and L can be

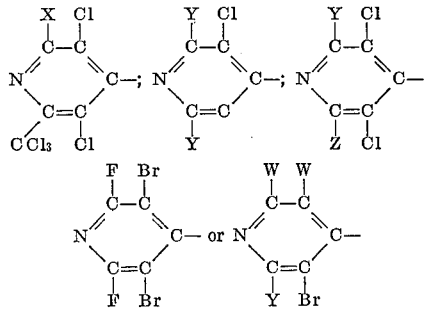

in which X can be chlorine or hydrogen, each Y can be chlorine, bromine or fluorine, Z can be Y or hydrogen, each W can be bromine or hydrogen and at least one W is bromine. The subject pyridine derivatives are described in U.S. Pats. Nos. 3,371,011 and 3,296,272, the disclosures of which are hereby incorporated by reference.

Preferably, the aforementioned pyridine derivatives are used in combination with carbodiimides such as those described in U.S. Pats. Nos. 3,193,522; 3,193,523; and 3,193,524 and German Pat. 924,751, the disclosures of which patents are incorporated herein by reference. The subject carbodiimides include monocarbodiimides, bis-carbodiimides and polycarbodiimides having a molecular weight of at least about 500 and at least one carbodiimide group for each 1500 molecular weight, said diimides having alkyl, aromatic and cycloalkyl substitutents, the monocarbodiimides specifically having alkyl or alkoxy groups of up to 18 carbon atoms, aralkyl groups, aryl groups, halogen atoms, nitro groups, carbomethoxyl groups, carboethoxyl groups and cyan groups as substituents, especially when the monocarbodiimides are phenyl or cyclohexyl monocarbodiimides and the substituents are attached in the 2 and 2′ positions.

Although the pyridines compounds alone inhibit fungal and bacterial growth, it has been found that the pyridine compounds and the carbodiimides synergistically combine when incorporated into a polyesterurethane to provide a polymeric material of improved resistance to microbes. By the method of this invention the polyesterurethanes so formed have resisted attack by microorganisms for an extended period of time. The carbodiimides are added alone or in combination with the pyridine compounds in amounts of from about 2 to 6 weight percent based on the polyesterurethane.

In the practice of this invention, one or more of the defined pyridine compounds and suitably a carbodiimide is used in combination with a polyesterurethane. Such polyesterurethanes can be thermoplastic or thermosetting. They can contain aromatic unsaturation and/or aliphatic unsaturation or they can be completely saturated. They can contain glycerol or other polyfunctional material to produce rigid foamed or non-foamed products. Conversely, they can be primarily difunctional and linear to produce flexible products. Consequently, the products of this invention can be, for example, cold and hot millable gums and elastomers, both rigid and flexible foams, adhesives, coatings, fibers, sealants and castings.

Typical products of this invention are prepared usually from linear, substantially non-crosslinked polyesterurethanes formed by the reaction of at least one diisocyanate or diisothiocyanate reactant (including mixtures thereof) with at least one difunctional active hydrogen compound, e.g. compounds having two terminal groups containing reactive hydrogen as determined by the Zerewitinoff method described in Journal of the American Chemical Society, vol. 49, p. 3181 (1927). The polyurethanes employed in the products of this invention can be thermoplastic polyesterurethanes which require no curing agent at all or polyesterurethanes which are cured with sulfur-containing agents. The products can also be prepared using polyesterurethanes which are curable or cured with peroxide. Thus, any polyurethane system based on polyesterurethanes can be rendered microbe resistant by the use of a pyridine compound in accordance with this invention.

Suitable diisocyanates and diisothiocyanates include compounds of the Formula R' (NCY)$_2$ in which each Y is sulfur or oxygen and where R' can be substituted or non-substituted alkylene, cycloalkylene, alkarylene or aralkylene radicals such as —R'ZR'— in which Z can be any divalent unit such as —O—, —OR'O—, —CO—, —S—, —SR'S—, —SO$_2$— and the like. Examples of such compounds include paraphenylene diisocyanate, metaphenylene diisocyanate, 1,5-naphthylene diisocyanate, 1,5-tetrahydronaphthylene diisocyanate, diphenylmethane-p,p'-diisocyanate, triphenylmethane-p,p'-diisocyanate, 1,6-hexamethylene diisocyanate, 1,4-tetramethylene diisocyanate, 1,10-decamethylene diisocyanate, 1,8-diisocyanate-p-methane, xylylene diisocyanates, tolylene diisocyanate, chlorophenylene diisocyanates such as 4-chloro-1,3-phenylene diisocyanate, 1,4-chlorohexylene diisocyanate, 4,4'-methylene-bis-(cyclohexylisocyanate), isopropylbenzene-alpha-4-diisocyanate, ethylphosphonic diisocyanate, phenylphosphonous diisocyanate and the sulfur analogs thereof. Such compounds are well known in the art.

In accordance with the practice of this invention the diisoycanates and/or diisothiocyanates are reacted with at least one difunctional compound so as to prepare a predominantly linear polyesterurethane having at most a minimum degree of crosslinking and containing some oxygen-carbon linkages in the polymeric structure thereof.

As used herein, a difunctional compound is a compound having two terminal groups each containing an active hydrogen atom as determined in the aforementioned Zerewitinoff method. The organic difunctional compounds contemplated herein include all compounds containing first, urethane and/or ester linkages and, second, terminal groups each containing at least one active hydrogen atom and, where flexible products are desired, preferably no more than one active hydrogen atom per terminal group. The groups containing active hydrogen are well known in the art and include, for example, groups containing hydrogen attached to oxygen such as alcoholic, phenolic, carboxylic and hydroperoxy groups; groups containing hydrogen attached to nitrogen such as amino, amido, ureido, urethano and sulfonamide groups; groups containing hydrogen attached to sulfur such as mercapto, thiophenolic and thioacidic groups; carbonyl groups capable of forming enols as in compounds such as acetone, malonic esters and acetoacetic esters and other miscellaneous groups with hydrogen attached to carbon, e.g. the ethynyl group, or hydrogen attached to oxygen attached to phosphorus, e.g. the phosphonic acid and ester groups.

The preferred terminal groups as the amino and alcoholic hydroxyl groups. Simple difunctional compounds can be used such as diethylene glycol, 2,2'-dihydroxydiethyl sulfide, tetraethyleneglycol and 2,2-diaminodiethyl sulfide, but generally molecular polymers are employed. Consequently, the preferable organic difunctional compounds contemplated herein are, for example, dihydroxy polyesters and polythioesters, dihydroxy polyesterurethanes and polythioesterurethanes, diamino polyesterurethanes and polythioesterurethanes, dihydroxy polyetheresterurethanes, diamino polyetheresterurethanes and mixtures thereof.

In accordance with the practice of this invention, the difunctional reactants are appropriately selected so as to prepare a peroxide-curable, substantially linear polyurethane. It is contemplated that the linear polyesterurethane may have linkages in the form of (—C—) or (—C—O—). Examples of such bonds include carbonyloxy groups and carbamyl groups.

In the practice of this invention, it has been discovered that the compounds contemplated herein are especially effective in preventing or inhibiting microrganism attack of polyurethanes, particularly polyesterurethanes, which contain a higher proportion of oxygen-carbon linkages than other types of polyurethanes.

Thus, in one specific embodiment hereof the pyridine compound contemplated herein suitably with a polycarbodiimide is incorporated into a cured or curable polyesterurethane formulation. In such embodiment the curable linear polyesterurethane may be prepared by any of the reactions well known in the art, e.g. by the reaction of at least one diisocyanate as defined hereinbefore and at least one dihydroxy polyester. Although the polyesterurethane contemplated herein may be saturated or unsaturated polyesterurethanes have been found to be especially suitable.

Suitable dihydroxy polyesters may be prepared by the esterification reaction of an aliphatic, aromatic, heterocyclic or cyclic dibasic acid or an anhydride thereof with a suitable difunctional polyol, e.g. the reaction of a dicarboxylic acid having the formula HO$_2$C(CH$_2$)$_x$CO$_2$H and an alkylene glycol having the formula HO(CH$_2$)$_y$OH, where $x$ and $y$ are integers.

The esterification is conducted in the presence of excess glycol, the resulting polyester having two hydroxyl terminal groups. High molecular weight polyesters with a relatively low weight ratio of active hydrogen produce more flexible polyesterurethane products than lower molecular weight polyesters having a greater weight ratio of active hydrogen.

Typical dicarboxylic acids which may be used in the esterification reaction include aliphatic acids such as oxalic, malonic, succinic, glutaric, maleic, adipic, pimelic, suberic, azelaic, sebacic, fumaric, glutaconic, dodecanedioic, 2-ethyl suberic, undecanedioic, diglycolic or thiodiacetic acid; aromatic acids such as phthalic, isophthalic, terephthalic, naphthalic, 3,5-pyridinedicarboxylic, 3,4-quinolinedicarboxlic, cinnamic or 4-(carboxymethoxy)-isophthalaldehydic acid; heterocyclics such as pyrrole-3,5-diglyoxylic, 3,5-pyridinedicarboxylic or 3,4-quinoline-dicarboxylic acid; and cycloaliphatic acids such as 1,2- cyclobutanedicarboxylic and 2,3-norcamphanedicarboxylic acids. In addition mixtures of such acids may be used.

Suitable difunctional polyols which can be used in the esterification reaction include difunctional aliphatic, aromatic and cycloaliphatic compounds such as heterocyclic and homocyclic compounds. The preferred compounds are alkylene glycols such as ethylene glycol, propylene glycol, butylene glycol, butylene-1,4-glycol and 1,2-propylene glycol and mixtures thereof.

The most commercially suitable polyesterurethanes are typically prepared by the esterification reaction of an aliphatic dicarboxylic acid and an alkylene glycol.

Specific examples and illustrations for preparing polyesterurethanes which can be employed in this invention are disclosed in U.S. Letters Patent Nos. 2,577,279; 2,770,612; 2,953,539; 2,957,832; 3,062,772; 3,148,167; 3,250,824; and 3,235,158; all of which are incorporated herein by reference.

As a further embodiment of this invention the incorporation of the contemplated pyridine compound in a polyesterurethane composition will provide a fungistat and a bacteriostat; that is, such pyridine compounds will inhibit or prevent the surface growth of microorganisms, particularly surface growing bacteria, on articles constructed out of the polyesterurethane compositions. This is particularly advantageous in the manufacture of laboratory or hospital equipment which should be free of live bacteria especially when touched or handled by perspiring hands or fingers.

In accordance with the further practice of this invention, suitable linear polyesterurethanes can be cured and crosslinked with a suitable peroxide, if desired.

Examples of suitable peroxides include, not by way of limitation, substituted and unsubstituted dialkyl and aralkyl peroxides such as dicumyl peroxide, ditertiary butyl peroxide, di-2,2-bis(t-butyl peroxy) butane, t-butylhydroperoxide, cumene hydroperoxide, p-menthane hydroperoxide, t-butyl perbenzoate, and 2,5-dimethyl-2,5-ditertiary butyl peroxy hexane as disclosed in U.S. Letters Patent Nos. 3,148,157 and 3,225,007.

In addition, ketone peroxide and diacyl peroxides may be used providing the polyesterurethane composition does not comprise carbon black. Examples of ketone and acyl peroxides include methyl ethyl ketone peroxide, cyclohexanone peroxide, lauroyl peroxide and benzoyl peroxide.

Other compounding ingredients may also be employed in the practice of this invention. Examples of suitable ingredients include pigments, fillers and reinforcing agents such as carbon black (except when ketone or acyl peroxides are used), silica, clay, calcium carbonate, magnesium carbonate, calcium silicate, wood pulp, cellulose, mica, talc (hydrous magnesium silicate) and color pigments; other polymers or copolymers such as butadiene-acrylonitrile copolymers and epoxides, e.g., as disclosed in U.S. Letters Patent 3,148,167; and inert volatile organic solvents such as tetrahydrofuran, dimethylformamide, dimethylsulfoxide and cyclohexanone.

Likewise, the polyesterurethane compositions contemplated herein may contain as additional ingredients blowing agents such as the well known fluorine-containing methane and ethane compounds, silicones, wetting agents, lubricants, such as stearic acid, emulsifiers, stabilizers, anti-degradants, and other compatible ingredients.

The polyesterurethane composition employed herein can be unsupported or alternatively can be supported as by a fabric adhered to the composition surface or embedded in the composition.

The subject invention is also applicable to composite polymeric systems in which the polyesterurethane portion is a major component, especially where the polyesterurethane is thermoplastic. Other polymers which exemplify the types of materials incorporated into such composite systems with thermoplastic polyesterurethanes include polyvinyl chloride, the various polyacrylates and polymethacrylates and other thermoplastic polymers.

The pyridine compounds and carbodiimides contemplated herein may be incorporated into a polyesterurethane composition or formulation at any convenient stage of the process, preferably prior to curing. While such incorporation is possible by swelling the cured polyesterurethane in a solution of the compounds, it is simple and at least as efficient to incorporate the compounds contemplated herein into the polyesterurethane prior to curing by use of a rubber mill or a Banbury mixer. Likewise, the compounds may be added to one or more reactants in which it is soluble, e.g. such as a dihydroxy polyester.

Likewise, the compounds contemplated herein can be added as a solid, such as a powder, or dispersed or dissolved in an appropriate inert solvent. A small amount of water can be used to prevent dusting.

The pyridine compound is added in an amount sufficient to inhibit and prevent the growth of microorganisms within or on the surface of the finally prepared polyesterurethane articles, that is, in an amount sufficient to prepare a substantially aseptic polyesterurethane. The exact amount of pyridine compounds contemplated herein will be a function of various factors, including the particular polyesterurethane used, the intended use of the product, the particular pyridine compound used of the numerous compounds contemplated and the manner and method of adding the pyridine compound.

As shown by the specific examples below, the beneficial effects of the pyridine compounds of this invention are apparent with as little as 0.1 percent by weight based on the weight of the polyesterurethane polymer, but at least 0.3 percent is preferable. Although the pyridine compounds can be used in amounts of 5 percent or more based on the weight of the polyesterurethane polymer, there is no practical reason to use more than about 4 percent, preferably no more than about 1 percent.

The beneficial effect of the carbodiimides employed in conjunction with the pyridine compounds is detected with as little as 0.1 percent by weight based on the weight of the polyesterurethane polymer. Although 10 weight percent or more can be used, preferably between about 2 and 6 weight percent is employed.

The following examples are merely illustrative of some of the best embodiments of this invention presently known to the inventor and are not intended to limit this invention which is properly delineated in the claims. Unless otherwise stated, all quantitative measurements are by weight.

EXAMPLE I

A polyesterurethane polymer was prepared by heating a mixture of about 0.98 mol of diphenylmethane-p,p'-diisocyanate and 1 mol poly 60/40 mol ratio (ethylene-butylene-1,4) adipate having a molecular weight of about 2,000 for approximately 40 hours at 115° C.

Test samples were prepared by compounding the following formulations using the polymer:

TABLE

|  | A | B | C | D |
|---|---|---|---|---|
| Polyesterurethane | 100 | 100 | 100 | 100 |
| Fast extrusion furnace carbon black | 25 | 25 | 25 | 25 |
| Di Cup 40 C (40% active dicumyl peroxide in a carrier) | 5 | 5 | 5 | 5 |
| Tetrachloro-4-methylsulfonylpyridine | 0 | 0.1 | 0.2 | 0.3 |

Tensile sheets from each sample were press-cured for 20 minutes at 320° F. and tested for various physical properties as shown below:

| Sample | 300% modulus, p.s.i. | Tensile, p.s.i. | Elongation, percent | Shore A |
|---|---|---|---|---|
| A | 2575 | 4300 | 430 | 65 |
| B | 2675 | 4450 | 420 | 63 |
| C | 2600 | 4250 | 400 | 64 |
| D | 2550 | 4375 | 450 | 66 |

The cured samples were tested for resistance to microbes by a microbe-seeding test. In this test, one inch by four inch test strips were stapled one-inch from the end to form one-inch long loops. The loops were then coated with a water dispersion of common fungi (Aspergillus, Alternaria, Penicillium) and bacteria (Achromobacter), and each strip was suspended in separate bottles over an aqueous suspension of these microbes. After three days the sample strip A with no tetrachloro-4-methylsulfonylpyridine had 75 cracks, $\frac{1}{64}$ of an inch long; the sample B had 30 cracks $\frac{1}{64}$ of an inch long and sample C had 10 cracks $\frac{1}{128}$ of an inch long. Sample D did not exhibit cracking even after 98 days. This test showed that the tetrachloro-4-methylsulfonyl-pyridine was functioning as a biocide in the polyesterurethane.

EXAMPLE II

A polyesterurethane thermoplastic was prepared from 1,4-butanediol, polybutylene adipate (M.W.: 2000) and diphenylmethane-p,p'-diisocyanate in an approximate molar ratio of 1:1:2 (see U.S. Pat. No. 2,871,218).

A control sample E was prepared by adding 0.2 part of stearic acid per 100 parts this polyesterurethane thermoplastic. Sample F was prepared identical to sample E except there was added also 0.3 part of tetrachloro-4-methylsulfonylpyridine. Tensile sheets were molded ten minutes at 270° F. from these compounds and had the following physical characteristics:

| Sample | 300% modulus, p.s.i. | Tensile, p.s.i. | Elongation, percent | Shore A |
|---|---|---|---|---|
| E | 1277 | 5304 | 530 | 69 |
| F | 1422 | 4978 | 520 | 69 |

Strips from each compound were formed into loops as previously described and were subjected to a soil burial test. The infested soil used was obtained from Battelle Memorial Institute and was used for Method 5762 of Federal Specification CCC-T-1916. The thermoplastic samples were buried in bacteria-infested soil and placed in a humidity cabinet of 30° C. and 100% relative humidity. In this test, the sample E had approximately 200 cracks after 9 days while the sample F did not exhibit cracking even after 50 days.

EXAMPLE III

A polyesterurethane thermoplastic sample G was prepared as in Example II, sample E. Sample H was then compounded similar to sample G with, additionally, 0.3 part of 2,3,5-trichloro-4-methylsulfonyl-pyridine per 100 parts polyesterurethane. Tensile sheets molded ten minutes at 270° F. had the following physical properties:

| Sample | 300% modulus, p.s.i. | Tensile, p.s.i. | Elongation, percent | Shore A |
|---|---|---|---|---|
| G | 1900 | 3025 | 390 | 70 |
| H | 2215 | 3225 | 390 | 70 |

After six days of soil burial testing as described in Example II, the control sample G had started to crack and had approximately 225 cracks at 19 days while the sample H still had no cracks after 19 days.

EXAMPLE IV

A polyesterurethane control sample I was prepared and was compounded like sample A of Example I. Samples J, K and L containing additionally 0.3, 1.0 and 2.0 parts per hundred of 2,3,5-trichloro-4-methylsulfonyl-pyridine, respectively, were prepared. Tensile sheets were cured 20 minutes at 320° F. and had the following physical properties:

| Sample | 300% modulus, p.s.i. | Tensile, p.s.i. | Elongation, percent | Shore A |
|---|---|---|---|---|
| I | 2475 | 4075 | 440 | 63 |
| J | 2550 | 4200 | 430 | 62 |
| K | 2400 | 3050 | 430 | 62 |
| L | 2250 | 4000 | 460 | 60 |

In the standard microbe seeding test, the sample I exhibited cracking in 3 days. The other samples (J, K and L) had not cracked after 20 days.

EXAMPLE V

A polyesterurethane was prepared as in Example I.
Test samples were prepared by compounding the following formulations:

|  | M | N | O | P |
|---|---|---|---|---|
| Polyesterurethane, parts | 100 | 100 | 100 | 100 |
| Fast extrusion furnace black, p.h.r | 25 | 25 | 25 | 25 |
| Di Cup 40 C. (40% active dicumyl peroxide with a carrier) | 4.5 | 4.5 | 4.5 | 4.5 |
| Tetrachloro-4-methylsulfonyl pyridine |  |  | 0.3 | 0.3 |
| Polycarbodiimide [1] |  | 4 |  | 4 |

[1] Mixture of di- and triisopropyl benzene polycarbodiimide as described in U.S. Patent 3,193,522.

Tensile sheets were cured 20 minutes at 320° F. and had the following physical properties:

|  | M | N | O | P |
|---|---|---|---|---|
| 300% modulus, p.s.i. | 2325 | 1950 | 2300 | 2025 |
| Tensile, p.s.i. | 4500 | 4450 | 4475 | 4200 |
| Elongation, percent | 490 | 580 | 480 | 530 |
| Shore A | 64 | 66 | 65 | 66 |

To test the effect of UV exposure, one tensile sheet from each compound was exposed 240 hours to UV in an Atlas Weatherometer, while another sheet from each compound was kept in a closed drawer. Strips from each sheet were then tested for resistance to microbes by the microbe seeding test described in Example I and the results are shown below:

|  | Days to first crack | Cracks at 22 days |
|---|---|---|
| Unexposed samples: |  |  |
| M | 3 | 100s |
| N | 5 | 100s |
| O | 22 | 2 |
| P | >22 | 0 |
| Samples exposed 240 hrs. to UV: |  |  |
| M | 3 | 100s |
| N | 3 | 100s |
| O | 5 | 20 |
| P | >22 | 0 |

The samples without tetrachloro-4-methyl sulfonylpyridine (M and N) were found to crack in 3 to 5 days whether previously exposed to UV or not. Compound O was affected to some extent by UV exposure. The unexposed sample exhibited cracking only after 22 days, and then had only two cracks about 1/64 of an inch long. However, a sample previously exposed 240 hours to UV exhibited cracking in 5 days, and had developed 20 cracks at the end of the 22 day test period. This indicated some deterioration of the tetrachloro-4-methylsulfonyl pyridine during the UV exposure. However, compounds containing both tetrachloro-4-methylsulfonyl pyridine and polycarbodiimide did not exhibit any cracking after 22 days, even when previously exposed to UV. The function of the polycarbodiimide was evidently to protect the tetrachloro-4-methylsulfonyl pyridine, since it can be seen that the polycarbodiimide by itself (compound N) had little if any biocidal action. The protective action of the tetrachloro-4-methylsulfonyl pyridine survives aging much better in the presence of the polycarbodiimide.

This test showed that the tetrachloro-4-methylsulfonyl pyridine and polycarbodiimide were functioning synergistically as a biocide in the polyesterurethane.

EXAMPLE VI 2,3,5-trichloro-4-methylsulfonyl pyridine was milled into a polyesterurethane prepared as in sample A. Test samples were prepared by compounding the following formulations:

|  | Q | R | S | T |
|---|---|---|---|---|
| Polyesterurethane, parts | 100 | 100 | 100 | 100 |
| Fast extrusion furnace black, p.h.i | 25 | 25 | 25 | 25 |
| Di Cup 40 C (40% active dicumyl peroxide with a carrier) | 5 | 5 | 5 | 5 |
| 2,3,5-trichloro-4-methylsulfonyl pyridine |  | 0.1 | 0.3 | 0.3 |
| Polycarbodiimide [1] |  |  |  | 4 |

[1] Mixture of di- and triisopropyl benzene polycarbodiimide as described in U.S. Patent 3,193,522.

Tensile sheets were cured 20 minutes at 320° F. and had the following physical properties:

|  | Q | R | S | T |
|---|---|---|---|---|
| 300% modulus, p.s.i. | 2700 | 2750 | 2675 | 2125 |
| Tensile, p.s.i. | 4575 | 4400 | 4625 | 4250 |
| Elongation, percent | 420 | 430 | 430 | 510 |
| Shore A | 963 | 63 | 64 | 65 |
| Microbe test: |  |  |  |  |
| Days to crack | 7 | 24 | 41 | >71 |
| Cracks at 71 days | 100s | 2 | 2 | 0 |

The above table also shows results of the microbe seeding test (previously described) run on these samples. It is seen that the 2,3,5-trichloro-4-methylsulfonyl pyridine was very effective in extending the time to appearance of cracking (compounds R and S). The excellent performance of compound T shows the benefit of adding polycarbodiimide in combination with the 2,3,5-trichloro-4-methylsulfonyl pyridine.

This test showed that the 2,3,5-trichloro-4-methyl-sulfonyl pyridine and polycarbodiimide were acting as an improved biocide in the polyesterurethane.

EXAMPLE VII

When each of the following carbodiimides is substituted weight for weight for the polycarbodiimide in the preparation described in Example V, similar excellent results are obtained:

diisopropylcarbodiimide
dicylclohexylcarbodiimide
methyl-tert.butylcarbodiimide
tert.butylphenylcarbodiimide
N-dimethylaminopropyl-tert.butylcarbodiimide
2,2'-dimethyl-diphenyl carbodiimide
2,2'-diisopropyl-diphenyl carbodiimide
2-dodecyl-2'-n-propyl-diphenylcarbodiimide
2,2'-ditolyl-diphenyl carbodiimide
2-O-dodecyl-2'-O-ethyl-diphenylcarbodiimide
2,2'-dichloro-diphenylcarbodiimide
2,2'-dinitro-diphenyl carbodiimide
2,2'-dibenzyl-diphenyl carbodiimide
2,2'-dinitro-diphenyl carbodiimide
2-ethyl-2'-isopropyl-diphenyl carbodiimide
2,6,2',6'-tetraethyl-diphenyl carbodiimide
2,6,2',6'-tetra-secondary-butyl-diphenyl carbodiimide
2,6,2',6'-tetraethyl-3,3'-dichloro-diphenyl carbodiimide
2,6,2',6'-tetraisopropyl-3,3'-dinitro-diphenyl carbodiimide
2-ethyl-cyclo hexyl-2-isopropyl-phenyl carbodiimide
2,4,6,2',4',6'-hexaisopropyl-diphenyl carbodiimide
2,2'-diethyl-dicyclohexyl carbodiimide
2,6,2',6'-tetraisopropyl-dicyclohexyl carbodiimide
2,6,2',6',-tetra-ethyl-dicyclohexyl carbodiiimde
2,2'-dichlorodicyclohexyl carbodiimide
2,2'-dicyano-diphenyl carbodiimide
2,2',6,6'-tetraethyl-diphenyl carbodiimide
2,6,2',6'-tetraethyl-4,4'-dimethyl diphenyl carbodiimide.

EXAMPLE VIII

When each of the following pyridine compounds is substituted for the pyridine compound in the preparation described in Example V, similar excellent results are obtained:

2,3,5,6-tetrachloro-4-(phenylsulfonyl)pyridine
2,3,5-trichloro-4-(dodecylsulfonyl)pyridine
3,5-dichloro-2,6-difluoro-4-(methylsulfonyl)pyridine
2-bromo-3,5-dichloro-4-(methyl sulfonyl)pyridine
2,3,6-trichloro-4-(ethylsulfinyl)pyridine
2,3,5-trichloro-4-(propylsulfinyl)pyridine
2,3,5-trichloro-4-(5'-bromopentylsulfonyl)pyridine
2,3,5-trichloro-4-(2,2-dichlorobutylsulfonyl)pyridine
2,3,4,6-tetrachloro-5-(methylsulfinyl)pyridine
2,3,5,6-tetrachloro-4-(methylsulfinyl)pyridine
2,3,5,6-tetrachloro-4-(propylsulfonyl)pyridine
2,3,5,6-tetrachloro-4-(ethylsulfonyl)pyridine
6-trichloromethyl-3,5-dichloro-4-(methylsulfonyl) pyridine
2,3,5-trichloro-4-(2'-bromoethylsulfonyl)pyridine
3,5-dichloro-2,6-difluoro-4-(butylsulfonyl)pyridine
2,3,5-trichloro-4-(benzylsulfonyl)pyridine
2,3,5-trichloro-4-(butylsulfinyl)pyridine
2-bromo-3,5-dichloro-4-(methylsulfonyl)pyridine
2,3,5-trichloro-4-(methylsulfinyl)pyridine
2,3,4,6-tetrachloro-5-(methylsulfinyl-pyridine
2,3,5,6-tetrachloro-4-(methylsulfinyl)pyridine
2,3,5,6-tetrachloro-4-(chloromethylsulfonyl)pyridine
2-trichloromethyl-3,5,6-trichloro-4-(methylsulfonyl) pyridine
3,5-dichloro-2,6-dibromo-4-(methylsulfinyl)pyridine
3,5-dichloro-2,6-difluoro-4-(butylsulfonyl)pyridine
2,3,5,6-tetrachloro-4-(2'-bromoethylsulfonyl)pyridine
2,3,5,6-tetrachloro-4-(2',3'-dichloropropylsulfonyl) pyridine
2,3,5,6-tetrachloro-4-(2',3'-dichloropropylsulfonyl) pyridine
2,3,5,6-tetrachloro-4-(butylsulfinyl)pyridine
2,3,5,6-tetrachloro-4-(decylsulfonyl)pyridine
2-trichloromethyl-3,5,6-trichloro-4-(methylsulfinyl) pyridine
2,3,5,6-tetrachloro-4-(o-bromophenylsulfonyl)pyridine
2,3,5,6-tetrachloro-4-(benzylsulfonyl)pyridine
2,3,5,6-tetrachloro-4-(p-chlorobenzylsulfonyl)pyridine
2,3,6-trichloro-4-(methylsulfonyl)pyridine
2-fluoro-3,5-dichloro-4-(methylsulfonyl)pyridine
2-trichloromethyl-3,5-dichloro-4-(methylsulfonyl) pyridine.

The embodiments of the invention in which an exclusive property or privilege is claimed are defined as follows:

1. A polyesterurethane composition containing a minor amount of a microbe-inhibiting pyridine compound of the formula L—M—R wherein R represents a member of the group consisting of alkyl, monohalogeno-lower alkyl, dihalogeno-lower alkyl, trihalogeno-lower alkyl, phenyl, monohalogeno phenyl, benzyl and monohalogeno benzyl; M represents a member of the group consisting of sulfinyl (—SO—) and sulfonyl (—SO₂—) and L is selected from the group consisting of

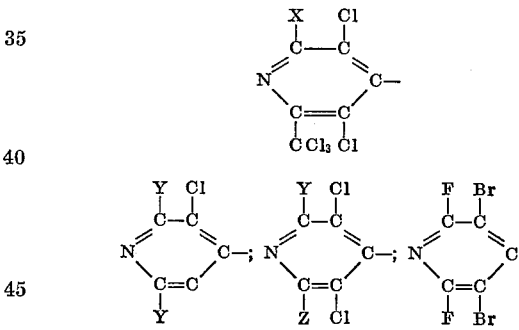

and

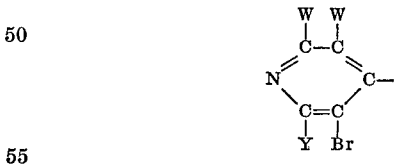

in which X represents a member of the group consisting of chlorine and hydrogen, each Y represents a member of the group consisting of chlorine, bromine and fluorine, Z represents a member of the group consisting of Y and hydrogen and each W represents a member of the group consisting of bromine and hydrogen and at least one W is bromine, said pyridine compound being used in admixture with a carbodiimide.

2. The composition of claim 1 wherein said compound is tetachloro-3-methylsulfonyl pyridine.

3. The composition of claim 1 wherein said compound is 2,3,5-trichloro-4-methylsulfonyl pyridine.

4. The composition of claim 1 wherein said compound is used in an amount of at least about 0.1 percent by weight based on the weight of the polyesterurethane and said carbodiimide is used in an amount of 0.1 to 10 weight percent based on the polyesterurethane.

5. The composition of claim 1 wherein said compound is used in an amount of at least about 0.1 percent by weight based on the weight of the polyesterurethane and said carbodiimide is used in an amount of 2–6 weight percent based on the polyesterurethane.

6. The composition of claim 5 wherein the polyesterurethane is peroxide curable.

7. The composition of claim 6 wherein the polycarbodiimide is triisopropyl benzene polycarbodiimide.

8. The composition of claim 7 wherein the polyesterurethane is a thermoplastic.

9. The composition of claim 7 wherein the polyesterurethane is a polyetheresterurethane.

10. The composition of claim 7 wherein the polyesterurethane is a polythioesterurethane.

11. The composition of claim 7 wherein the polyesterurethane is a diamino polyesterurethane.

12. The composition of claim 7 wherein the polyesterurethane is a saturated polyesterurethane.

References Cited

UNITED STATES PATENTS

| | | | |
|---|---|---|---|
| 3,006,870 | 10/1961 | Steinfatt et al. | 260—2.5 |
| 3,148,167 | 9/1964 | Keplinger | 260—40 |
| 3,297,795 | 1/1967 | Peter et al. | 260—897 |
| 3,369,027 | 2/1968 | Klauke et al. | 260—309.2 |
| 3,371,011 | 2/1968 | Johnston | 424—263 |
| 3,388,159 | 6/1968 | Sayigh et al. | 260—556 |
| 3,446,779 | 5/1969 | Finelli et al. | 260—75 |

DONALD E. CZAJA, Primary Examiner

R. A. WHITE, Assistant Examiner

U.S. Cl. X.R.

260—2.5, 37, 45.9, 75, 858; 424—78